(12) United States Patent
Cox et al.

(10) Patent No.: US 11,584,377 B2
(45) Date of Patent: Feb. 21, 2023

(54) LIDAR BASED DETECTION OF ROAD SURFACE FEATURES

(71) Applicant: GM Cruise Holdings LLC, San Francisco, CA (US)

(72) Inventors: Matthew Cox, San Francisco, CA (US); Pranay Agrawal, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 413 days.

(21) Appl. No.: 16/690,898

(22) Filed: Nov. 21, 2019

(65) Prior Publication Data

US 2021/0155248 A1    May 27, 2021

(51) Int. Cl.

| B60W 30/095 | (2012.01) |
| G01S 17/89 | (2020.01) |
| B60W 40/06 | (2012.01) |
| B62D 6/00 | (2006.01) |
| G05D 1/02 | (2020.01) |
| G06N 3/08 | (2023.01) |
| G06V 20/56 | (2022.01) |

(52) U.S. Cl.
CPC ........ *B60W 40/06* (2013.01); *B60W 30/0956* (2013.01); *B62D 6/006* (2013.01); *G01S 17/89* (2013.01); *G05D 1/024* (2013.01); *G05D 1/0214* (2013.01); *G06N 3/08* (2013.01); *G06V 20/588* (2022.01); *B60W 2420/52* (2013.01)

(58) Field of Classification Search
CPC .............. B62D 15/025; B62D 15/0265; G06N 3/0454; G01S 7/4802; G01S 7/4808; G01S 17/42; G01S 17/87; G01S 17/931; G06K 9/00791; G06K 9/6256; G06K 9/6271
See application file for complete search history.

(56) References Cited

U.S. PATENT DOCUMENTS

| 6,119,112 A * | 9/2000 | Bush ........................ G06N 3/08 706/25 |
| 6,351,711 B1 * | 2/2002 | Chansarkar ............. G01S 19/42 701/481 |
| 9,079,587 B1 * | 7/2015 | Rupp .................... G05D 1/0289 |
| 9,201,424 B1 * | 12/2015 | Ogale ........................ G06T 7/80 |
| 10,486,485 B1 * | 11/2019 | Levinson ............ B60G 17/0162 |
| 10,552,979 B2 * | 2/2020 | Zhu ........................... G06T 7/55 |
| 10,666,342 B1 * | 5/2020 | Landis ................. H04B 7/0632 |
| 10,671,083 B2 * | 6/2020 | Zhu .......................... G06T 7/246 |
| 10,688,985 B2 * | 6/2020 | Yu .......................... B60W 40/06 |

(Continued)

*Primary Examiner* — Peter D Nolan
*Assistant Examiner* — Anwar Mohamed
(74) *Attorney, Agent, or Firm* — Calfee, Halter & Griswold LLP

(57) ABSTRACT

An AV is described herein. The AV includes a lidar sensor system. The AV additionally includes a computing system that executes a road surface analysis component to determine, based upon lidar sensor data, whether a road surface feature is present on or in a roadway in a travel path of the AV. The AV can be configured to initiate a mitigation maneuver responsive to determining that the road surface feature is present. Performing the mitigation maneuver causes the AV to avoid the road surface feature or decelerate prior to reaching the road surface feature, thereby improving the apparent quality or comfort of the ride to a passenger of the AV.

20 Claims, 9 Drawing Sheets

(56) References Cited

U.S. PATENT DOCUMENTS

| | | | |
|---|---|---|---|
| 10,943,485 B2* | 3/2021 | Tao | G05D 1/0223 |
| 10,981,564 B2* | 4/2021 | Herman | G08G 1/166 |
| 2005/0134440 A1* | 6/2005 | Breed | G01S 17/931 |
| | | | 701/45 |
| 2009/0079622 A1* | 3/2009 | Seshadri | G01S 19/05 |
| | | | 342/357.42 |
| 2010/0030473 A1* | 2/2010 | Au | G06V 20/56 |
| | | | 701/28 |
| 2010/0164789 A1* | 7/2010 | Basnayake | G01S 5/0072 |
| | | | 342/357.23 |
| 2012/0116677 A1* | 5/2012 | Higgison | G01S 5/0027 |
| | | | 701/518 |
| 2013/0093618 A1* | 4/2013 | Oh | G01S 19/45 |
| | | | 342/357.44 |
| 2013/0151450 A1* | 6/2013 | Ponulak | G06N 3/049 |
| | | | 706/25 |
| 2015/0097719 A1* | 4/2015 | Balachandreswaran | |
| | | | G01B 11/002 |
| | | | 342/147 |
| 2015/0221079 A1* | 8/2015 | Schultz | G06T 7/13 |
| | | | 382/190 |
| 2016/0018527 A1* | 1/2016 | Oh | G01S 19/07 |
| | | | 701/468 |
| 2017/0158191 A1* | 6/2017 | Bills | B60W 10/06 |
| 2017/0213149 A1* | 7/2017 | Micks | G08G 1/167 |
| 2018/0059248 A1* | 3/2018 | O'Keeffe | G01S 7/4817 |
| 2018/0121748 A1* | 5/2018 | Kwak | G06N 3/084 |
| 2018/0224863 A1* | 8/2018 | Fu | G06V 20/588 |
| 2018/0329418 A1* | 11/2018 | Baalke | G06Q 50/28 |
| 2018/0330238 A1* | 11/2018 | Luciw | G06V 10/82 |
| 2019/0096086 A1* | 3/2019 | Xu | G01S 7/417 |
| 2019/0329771 A1* | 10/2019 | Wray | B60W 30/18163 |
| 2019/0381999 A1* | 12/2019 | Yu | G05D 1/0088 |
| 2020/0026965 A1* | 1/2020 | Guo | G06V 10/82 |
| 2020/0110817 A1* | 4/2020 | Viswanathan | G06F 16/215 |
| 2020/0209864 A1* | 7/2020 | Chen | G05D 1/0221 |
| 2020/0255020 A1* | 8/2020 | Simmons | B60W 10/18 |
| 2020/0262416 A1* | 8/2020 | Yu | B60W 30/025 |
| 2021/0033706 A1* | 2/2021 | Funaya | G01S 7/4808 |
| 2021/0217387 A1* | 7/2021 | Lim | G09G 5/391 |
| 2021/0302583 A1* | 9/2021 | Agrawal | G01S 17/89 |

* cited by examiner

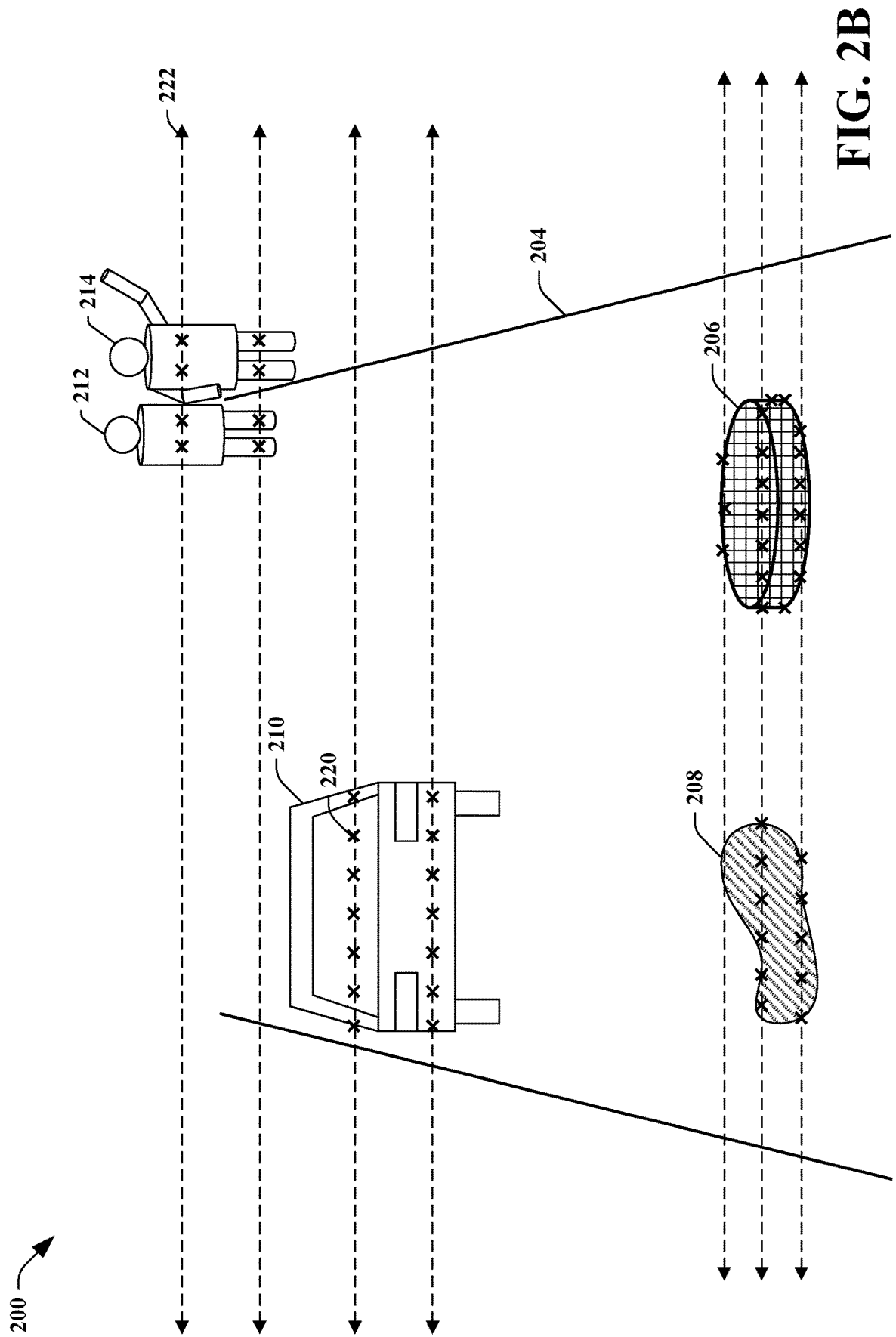

LIDAR BASED DETECTION OF ROAD SURFACE FEATURES

BACKGROUND

An autonomous vehicle (AV) is a motorized vehicle that can operate without human conduction. An exemplary AV includes a plurality of sensor systems, such as, but not limited to, a lidar sensor system, a camera sensor system, and a radar sensor system, amongst others, wherein the AV operates based upon sensor signals output by the sensor systems. For example, a radar system can identify a range from the AV to another vehicle in the driving environment. In another example, an object recognition system may be configured to receive lidar signals output by a lidar sensor system and to identify positions of objects captured in the images.

An AV can be deployed as part of an on-demand transportation service. Whereas a quality or feel of the ride of a vehicle may be unimportant in connection with transporting cargo relative to other concerns (e.g., time of travel, speed of travel, fuel consumption, etc.), the apparent quality of the ride may be among the most important aspects of AV performance when transporting passengers.

Conventionally, AVs have been configured to avoid certain maneuvers that are likely to cause discomfort to passengers. By way of example, AVs have been configured to accelerate or decelerate slower than a threshold rate to avoid sudden stops and starts that may be uncomfortable or disconcerting to passengers. However, AVs have conventionally been unable to address problems of ride quality that arise from various features of a road surface itself (such as, but not limited to, potholes, speed bumps, broken pavement, utility access covers, etc.). Conventionally, AVs have been unable to detect such road surface features that have a negative impact on the apparent smoothness or comfort of a ride for a passenger.

SUMMARY

The following is a brief summary of subject matter that is described in greater detail herein. This summary is not intended to be limiting as to the scope of the claims.

Described herein are various technologies pertaining to controlling operation of an AV. With more specificity, described herein are various technologies pertaining to an AV that is configured to determine that a surface feature that may affect performance of the AV exists in a road surface in a traveling path of the AV. Still further, technologies are described herein that pertain to an AV that is further configured to execute an avoidance or mitigation maneuver to avoid the feature or mitigate its effect on the performance of the AV.

In a non-limiting example, an AV includes a lidar sensor system that comprises at least one lidar sensor. The lidar sensor system outputs lidar data based on sensor signals received from the at least one lidar sensor, where the lidar data is indicative of positions of objects in the driving environment of the AV at one or more times. In an exemplary embodiment, the lidar data comprises a three-dimensional lidar point cloud, wherein each point in the point cloud indicates a three-dimensional position of an object or surface of an object in the driving environment of the AV. In exemplary embodiments, one or more lidar sensors included in the lidar sensor system can be aimed toward a road surface that is in a travel path of the AV. Thus, the lidar sensor system can output data indicative of positions of the road surface and any road surface features on or in a portion of the road surface in the travel path of the AV (e.g., potholes, uneven pavement, speed bumps, utility access covers, and the like).

The AV can include a road surface analysis component that is configured to receive lidar data that is indicative of positions of a plurality of points on the road surface in the travel path of the AV from the lidar sensor system. Responsive to receipt of the lidar data, the road surface analysis component determines whether a road surface feature that potentially affects ride quality is present on or in the road surface. In an exemplary embodiment, the road surface analysis component determines whether the road surface feature is present based upon output of a neural network. In such embodiments, the road surface analysis component provides position values of points in a lidar point cloud that are representative of a road surface (e.g., as opposed to other objects in a driving environment of the AV, such as pedestrians, cars, buildings, etc.) to the neural network. Responsive to receipt of the position values, the neural network can output data indicative of a probability that a road surface feature is present on or in the road surface. In various embodiments, the neural network can be trained based upon human-labeled or machine-labeled lidar data, wherein the labeled lidar data is labeled as being representative of a road surface feature or not representative of a road surface feature.

In further embodiments, the road surface analysis component determines whether the road surface feature is present based upon an existing height map of the road surface in the travel path of the AV. By way of example, the AV can include a data store having loaded therein a map of roads in an operational region of the AV for use by the AV in connection with navigating through the operational region. The map of roads can include a height map of road surfaces in the operational region. The road surface analysis component can extract a height map of a portion of the road surface based upon lidar data received from the lidar sensor system. The road surface analysis component can then identify that a road surface feature is present on the roadway based upon the extracted height map indicating a different height than the height map stored in the data store.

In another exemplary embodiment, the road surface analysis component determines whether the road surface feature is present based upon comparison of a signature of lidar data representative of a road surface to a library of signatures that are labeled as or known to be representative of road surface features that are potentially disruptive to ride quality of an AV. In such embodiment, the road surface analysis component can extract a signature of a road surface feature from lidar data received from the lidar sensor system. The extracted signature can be any of various data pertaining to the received lidar data that can be indicative of the presence of a road surface feature. In a non-limiting example, the road surface analysis component can extract a height map of a portion of the road surface in the travel path of the AV from the points included in the lidar data. Subsequently, the road surface analysis component can compare the height map to a library of height maps that are representative of road surfaces having one or more road surface features present thereon or therein. Based upon the comparing, the road surface analysis component can determine whether the extracted height map is indicative of the presence of a road surface feature in the travel path of the AV.

Responsive to the road surface analysis component determining that a road surface feature that can affect ride quality of an AV is present in the travel path of the vehicle, the AV can be controlled to avoid the road surface feature, slow down prior to reaching the road surface feature, or perform some other maneuver that mitigates the effect of the road surface feature on the ride quality.

Upon determining that a road surface feature that may be detrimental to ride quality of an AV is present on a roadway, the AV can further update map data that is stored on the AV such that the map data is indicative of the presence of the road surface feature. The AV can further be configured to communicate with a remote server that maintains map data and that is in communication with a plurality of additional AVs. The AV can output data indicative of the presence of the road surface feature to the remote server, and the remote server can communicate with the additional AVs to cause the additional AVs to update their own respective map data with an indication that the road surface feature is present on the roadway. Thereafter, operation of any or all of the AVs can be controlled based upon the map data indicating the presence of the road surface feature (e.g., by causing the AVs to avoid the road surface feature).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2B is a head-on view of the exemplary driving environment depicted in FIG. 2A.

DETAILED DESCRIPTION

Figure 1:
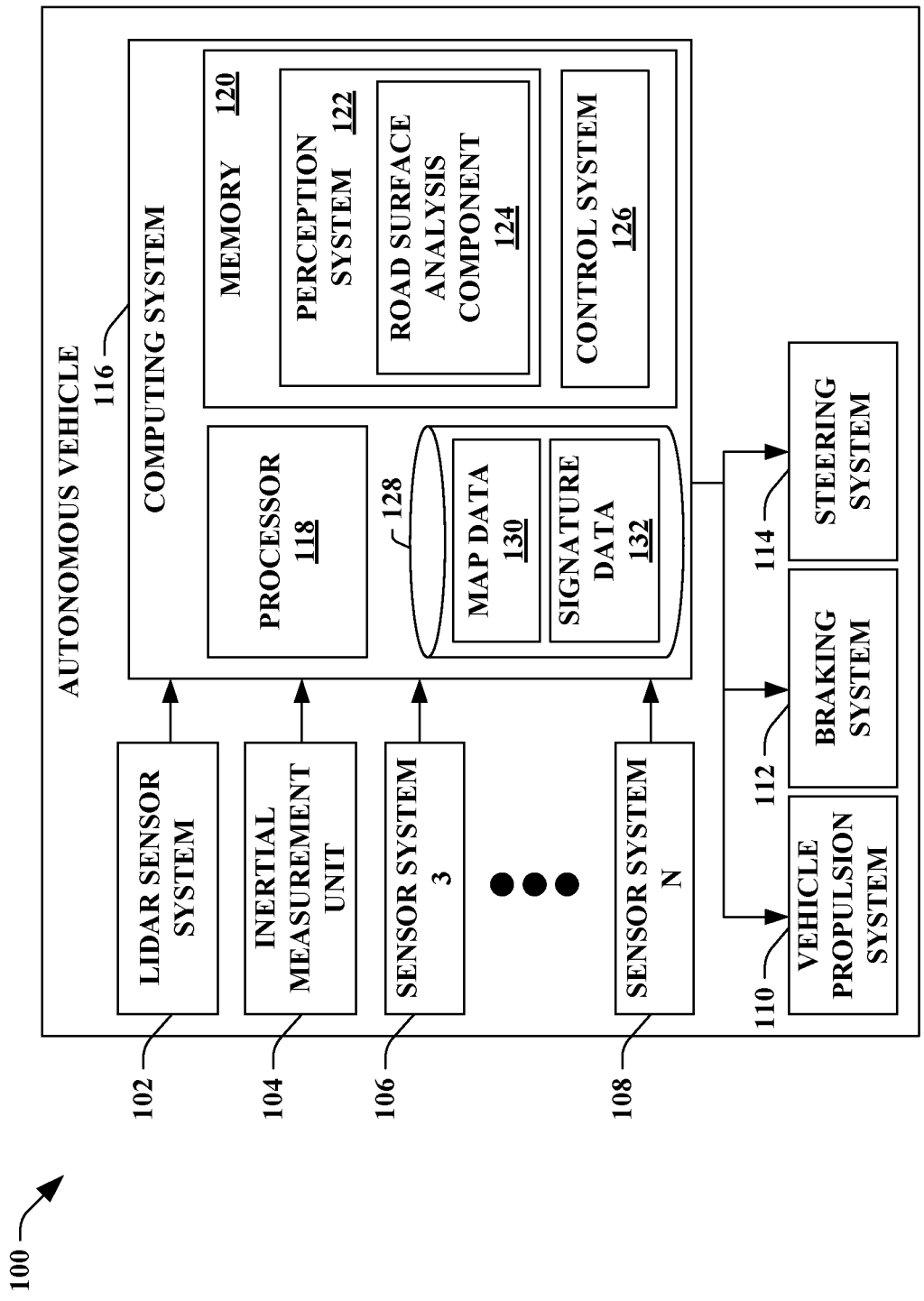
FIG. 1 illustrates an exemplary AV.

Various technologies pertaining to an AV that is configured to determine whether one or more road surface features are present in or on a roadway are described herein, wherein like reference numerals are used to refer to like elements throughout. With more particularity, technologies described herein facilitate detecting the presence of road surface features that can negatively affect a rider's perceived ride quality, such as a pothole, a speedbump, or a temporary obstruction (e.g., a fallen limb, a cardboard box, motor accident debris, etc.). In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As used herein, the term "road surface feature" is intended to refer to depressions, protuberances, debris, or other features that are present on or in a surface of a roadway, and that affect the orientation of a vehicle as the vehicle travels over them. By way of various examples, the term "road surface feature" is intended to encompass holes, divots, gashes, and other depressions, speed bumps, rumble strips, manhole covers, and other protuberances, debris, and the like. It is to be appreciated that some road surface features may be present in a surface of a roadway, such as speed bumps and pot holes. It is to be appreciated that other road surface features may be present on a surface of a roadway, such as various forms of debris.

With reference now to FIG. 1, an exemplary AV 100 is illustrated. The AV 100 can navigate about roadways without human conduction based upon sensor signals output by sensor systems of the AV 100. The AV 100 includes a lidar sensor system 102, an inertial measurement unit (IMU) 104, and a plurality of additional sensor systems 106-108 (a third sensor system 106 through an Nth sensor system 108). The sensor systems 106-108 may be of different types. For example, the third sensor system 102 may be a radar sensor system and the Nth sensor system 104 may be a camera (image) system. Other exemplary sensor systems include GPS sensor systems, sonar sensor systems, infrared sensor systems, and the like. The various sensor systems 102-108 are arranged about the AV 100.

The AV 100 further includes several mechanical systems that are used to effectuate appropriate motion of the AV 100. For instance, the mechanical systems can include but are not limited to, a vehicle propulsion system 110, a braking system 112, and a steering system 114. The vehicle propulsion system 110 may be an electric engine, an internal combustion engine, or a combination thereof. The braking system 112 can include an engine brake, brake pads, actuators, a regenerative braking system, and/or any other suitable componentry that is configured to assist in decelerating the AV 100. The steering system 114 includes suitable componentry that is configured to control the direction of movement of the AV 100.

The AV 100 additionally comprises a computing system 116 that is in communication with the sensor systems 102-108 and is further in communication with the vehicle propulsion system 110, the braking system 112, and the steering system 114. The computing system 116 includes a processor 118 and memory 120 that includes computer-executable instructions that are executed by the processor 118. In an example, the processor 118 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 120 comprises a perception system 122 that is configured to identify objects (in proximity to the AV 100) captured in sensor signals output by the sensor systems 102-108. The perception system 122 includes a road surface analysis component 124. Briefly, the road surface analysis component 124 is configured to determine whether a road surface feature that can affect ride quality of the AV 100 is present on or in a roadway that is in a travel path of the AV 100. The road surface analysis component 124 can determine whether the road surface feature is present based upon sensor signals output by the sensor systems 102-108. As will be described in greater detail below, the perception system 122 may further include various additional components that are configured to output data indicative of positions and/or predefined types of objects in a driving environment of the AV 100. In various embodiments, the road surface analysis component 124 can determine whether a road surface feature is present on a roadway based upon data output by such additional components of the perception system 122, in addition to the sensor signals output by the sensor systems 102-108.

The memory 120 additionally includes a control system 126 that is configured to receive output of the perception system 122, and is further configured to control at least one of the mechanical systems of the AV 100 (the vehicle propulsion system 110, the brake system 108, and/or the steering system 114) based upon the output of the perception system 122. In an exemplary embodiment, the road surface analysis component 124, responsive to determining that a road surface feature is present on or in the roadway, outputs an indication of the road surface feature to the control system 126. By way of example, the road surface analysis component 124 can output an identified location of a road surface feature to the control system 126. The control system 126 can then control operation of at least one of the mechanical systems of the AV 100 based upon the indication from the road surface analysis component 124. In a non-limiting example, the control system 126 can cause the AV 100 to initiate a mitigation maneuver responsive to receiving the indication that the road surface is present on or in the roadway. The mitigation maneuver can include deceleration of the AV 100, or can include evasive maneuvers such as changing a lane in which the AV 100 is traveling, causing the AV 100 to make a turn, etc.

The computing system 116 further includes a datastore 128. The datastore 128 stores map data 130 that is representative of an operational region of the AV 100 (e.g., a city, town, or other geographic area in which the AV 100 operates). The map data 130 can include, for example, locations of roadways in the operational region, a heightmap of roadways in the operational region, and locations of navigational points of interest in the operational region (e.g., addresses, restaurants, tourist attractions, etc.). The map data 130 can further include avoidance area data. The avoidance area data can indicate one or more avoidance areas through which the AV 100 is prohibited from being routed.

As described above, a roadway on which an AV is traveling can have one or more surface features or imperfections. These road surface features can cause a passenger of the AV to perceive that the ride of the AV is rough when the AV travels over the road surface features. By way of example, and with reference now to FIGS. 2A and 2B, two views of an exemplary driving environment 200 of an AV 202 are illustrated. The driving environment 200 includes a roadway 204 on which the AV 202 travels, wherein the roadway 204 can include one or more road surface features that deviate from an average height of the roadway 204. The roadway 204 includes, for example, a manhole cover 206 and a pothole 208. When the AV 202 travels over either the manhole cover 206 or the pothole 208, the manhole cover 206/pothole 208 subjects the AV 202 to forces that cause a passenger of the AV 202 to perceive jostling or bumpiness in the ride of the AV 202.

The road surface analysis component 124 is configured to determine whether a road surface feature is present on or in a roadway on which the AV 100 is traveling based upon lidar data output by the lidar sensor system 102. It is to be understood that while the road surface analysis component 124 is described herein as determining whether a road surface feature is present in a travel path of the AV 100, the road surface analysis component 124 can be configured to determine the presence or absence of road surface features in or on substantially any portion of a road surface that is represented by lidar data output by the lidar sensor system 102. In an exemplary embodiment, the lidar data comprises a three-dimensional point cloud. The point cloud includes a plurality of points that are each assigned a three-dimensional position in the driving environment (e.g., a coordinate triple). The positions of points in the point cloud are indicative of locations of objects, or surfaces of objects, in the driving environment of the AV 100. Each of the points can further be assigned an intensity value that is indicative of an intensity of the lidar return received at the lidar sensor system 102 from each of the points.

Figure 2A:
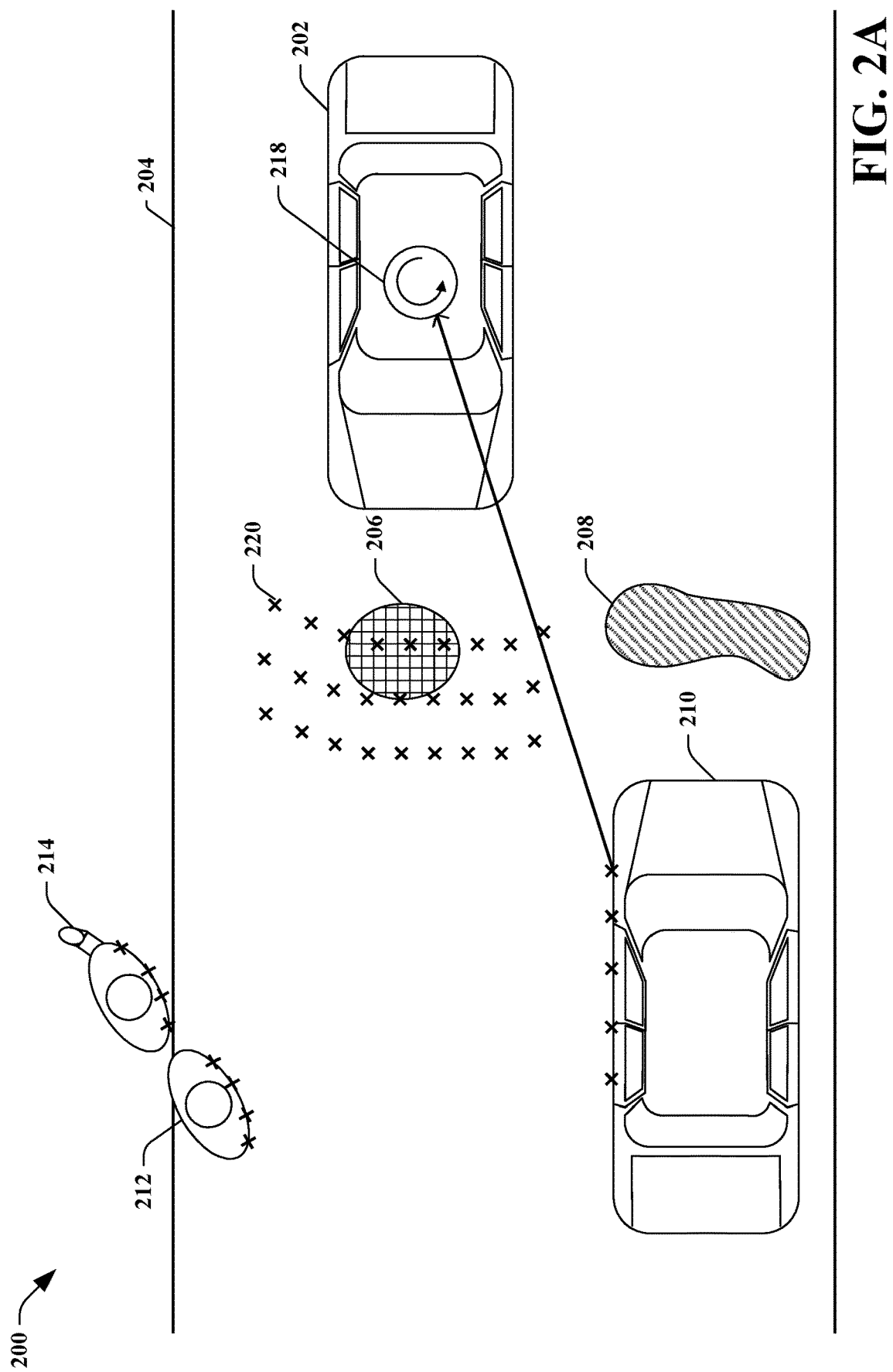
FIG. 2A is a top-down view of an exemplary driving environment of an AV.

Exemplary operation of the AV 100 in connection with generating lidar data is now set forth. With reference now to FIG. 2A, the AV 202 is depicted in the driving environment 200, wherein the driving environment includes a second vehicle 210, and two pedestrians 212, 214 standing to the side of the roadway 204. The AV 202 emits a laser beam 216 into the driving environment 200 by way of a lidar sensor system 218. The laser beam 216 can be scanned 360° around the AV 202, or within an arc of less than 360° about the AV 202, and can impinge upon the various objects (e.g., the second vehicle 210 and the pedestrians 212, 214) in the environment 200. The lidar sensor system 218 receives reflections of the beam 216, and based upon such reflections outputs data indicative of positions of a plurality of points of intersection (e.g., 220) of the beam 216 with the objects in the driving environment 200. By way of example, the lidar sensor system 218 outputs data indicating a three-dimensional position of each of the points 220 (e.g., relative to the AV 202, relative to a point of reference in the driving environment 200 or outside of the driving environment 200, etc.). It is to be understood that when the laser beam 216 intersects a surface of the roadway 204, the lidar sensor system 218 outputs data indicative of positions of the surface of the roadway 204.

It is to be understood that while a single laser beam 216 and a plurality of points of intersection 220 of the beam 216 with objects are depicted in FIG. 2A, the lidar sensor system 218 can emit a plurality of laser beams into a driving environment of the AV 202. For instance, and referring now to FIG. 2B, a head-on view of the driving environment 200 from the perspective of a passenger of the AV 202 is depicted. In exemplary embodiments, the lidar sensor system 218 emits a plurality of laser beams into the driving environment of the vehicle 202, wherein each of the beams has a different angular alignment with respect to a horizontal reference plane of the vehicle 202. Further, each of a plurality of sensors in the lidar sensor system 218 may be aligned with a different respective lidar beam emitted by the lidar sensor system 218, such that the lidar sensor system 218 outputs data indicative of a plurality of points of intersection for each of the plurality of beams over a period of time. As depicted in FIG. 2B, the plurality of laser beams scan across the objects in the driving environment 200 and intersect the objects along scan lines (e.g., 222). Each of the points 220 where a laser beam of the lidar sensor system 218 intersects an object or the roadway 204 in the driving environment lies along one of the scan lines 222. Hence, each of the plurality of lidar sensors in the lidar sensor system 218 outputs data indicative of points of intersection of a respective laser beam with various objects in the driving environment 200 along a respective scan line. A lidar point cloud output by the lidar sensor system 218 can therefore be considered a rastered image of objects and surfaces in the driving environment, including a surface of the roadway 204, comprising as many scan lines as lasers are included in the lidar sensor system 218.

At least a portion of the points 220 are representative of a surface of the roadway 204. A subset of this portion of the points 220 is representative of the road surface features 206, 208. As will be described in greater detail below, an AV can determine that the road surface features 206, 208 are present in the roadway 204 based upon the portion of the lidar points 220 that are representative of the roadway 204 (as opposed to the other objects 210, 212, 214). In exemplary embodiments, the lidar sensor system 102 of the AV 100 can be configured such that a lidar point cloud generated by the lidar sensor system 102 has a high density of points that are representative of a roadway in a travel path of the AV 100. By way of example, the lidar sensor system 102 can be configured such that a density of points on a road surface within 5 meters of a front of the AV 100 is at least 1000 points per square meter, 1250 points per square meter, or 1450 points per square meter.

It is to be appreciated that over the period of a scan of a driving environment of the AV 100 by the lidar sensor system 102, the lidar sensor system 102 can output data indicative of positions of a larger number of points than are depicted in FIGS. 2A and 2B (e.g., tens of thousands of points, hundreds of thousands of points, millions of points, etc.). Furthermore, it is to be appreciated that the lidar sensor system 102 can include a greater number of lidar beams and sensors than depicted in either of FIGS. 2A or 2B. By way of example, the lidar sensor system 102 can include at least 64 beams and corresponding sensors, at least 128 beams and corresponding sensors, or at least 256 beams and corresponding sensors.

Referring again to FIG. 1, the AV 100 can be configured such that the perception system 122 selectively outputs lidar data to the road surface analysis component 124. By way of example, the perception system 122 outputs to the road surface analysis component 124 lidar data that is determined to be representative of a surface of a roadway on which the AV 100 travels. By way of example, the perception system 122 can be configured to identify a subset of points in a lidar point cloud generated by the lidar sensor system 102 that are likely to be representative of the surface of the roadway on which the AV 100 travels. The perception system 122 outputs the subset of points in the point cloud that are representative of the roadway surface to the road surface analysis component 124. The road surface analysis component 124, based on the subset of points, determines whether a road surface feature is present on or in the roadway. For example, and referring once again to FIG. 2B, there is a subset of the points 220 that is representative of the roadway 204. The perception system 122 of the AV 100 can determine which of the points 220 is representative of the roadway 204. The road surface analysis component 124 can then determine that the road surface features 206, 208 are present in the roadway 204 based upon the subset of the points 220 that are representative of the roadway 204.

Figure 3:
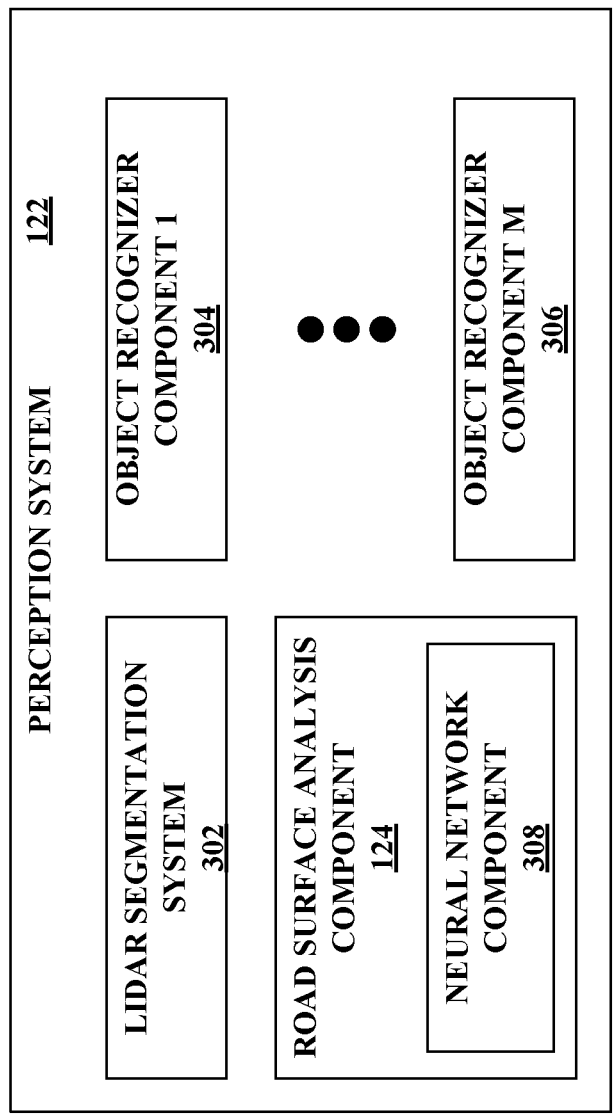
FIG. 3 is a functional block diagram of an exemplary perception system of an AV that includes a road surface analysis component.

Referring now to FIG. 3, an exemplary embodiment of the perception system 122 is shown, wherein the perception system 122 comprises the road surface analysis component 124 and further comprises a lidar segmentation system 302 and a plurality of M additional object recognizer components 304-306, wherein M is a non-zero integer. The lidar segmentation system 302 is configured to perform a segmentation of a lidar point cloud (e.g., as received by the perception system 122 from the lidar sensor system 102). Stated differently, the lidar segmentation system 302 is configured to determine which points in the lidar point cloud are representative of which objects in the driving environment of the AV 100. The lidar segmentation system 302 can further be configured to output an indication of a type of object for each of the objects in the driving environment of the AV 100. These predefined types of objects can include, but are not limited to, road surface, pedestrian, bike, car, truck, bus, and static, where the type "static" can represent objects that are usually not in motion such as telephone poles, construction equipment, buildings, etc.

Each of the additional object recognizer components 304-306 independently generates output based upon at least one sensor signal. In non-limiting examples, the second object recognizer component 204 outputs data indicative of types of objects based upon images output by a camera, the Mth object recognizer component outputs data indicative of ranges to objects based upon radar signals, etc. In exemplary embodiments, the perception system 122 can be configured to determine which points in the lidar point cloud are representative of a surface of a roadway based upon data output by the lidar segmentation system 302 and the object recognizer components 304-306. For example, the perception system 122 can identify which lidar points in a lidar point cloud are representative of which of various objects, such as the second vehicle 210 and the pedestrians 212, 214, in the driving environment 200 based upon data output by the lidar segmentation system 302. The perception system 122 can then identify that the object 210 is a vehicle and that the objects 212, 214 are pedestrians based upon output of one or more of the other object recognizer components 304-306.

In some embodiments, the perception system 122 can be configured to identify which points in a lidar point cloud are representative of a road surface based upon points in a lidar point cloud not being identified by the lidar segmentation system 302 or the object recognizer components 304-306 as any other type of object. In another non-limiting example, the perception system 122 can identify which points in a lidar point cloud are representative of a road surface based upon the map data 130 stored in the data store 128. For instance, the map data 130 can indicate positions of known roadways in the driving environment of the AV 100. The lidar segmentation system 302 can identify which points in a lidar point cloud are representative of a road surface based upon the positions of the roadways indicated in the map data 130.

The road surface analysis component 124 receives lidar point cloud data that is representative of a road surface in the driving environment of the AV 100 and determines whether a road surface feature is present on the roadway based upon the lidar point cloud data.

In the exemplary perception system 122 of FIG. 3, the road surface analysis component 124 comprises a neural network component 308. The neural network component 308 is configured to receive an input feature vector that is representative of a road surface in a travel path of the AV 100, and to output data that is indicative of a probability that a road surface feature is present in or on the road surface. The neural network component 308 is or includes a DNN that includes an input layer, one or more hidden layers, and an output layer. Each of the layers comprises one or more nodes, and nodes of each layer are connected to nodes in one or more other layers by way of edges. The edges and the nodes of the DNN can have weights assigned respectively thereto. Thus, each edge can be assigned a different weight (e.g., during a training procedure described in greater detail below), and each node that is assigned a weight can be assigned its own weight. The DNN outputs the data indicative of the probability that the road surface feature is present based upon propagating the vector of input features through the layers of the DNN to the output layer. In an exemplary embodiment, the DNN can be a convolutional neural network (CNN).

The input feature vector input to the neural network component 308 can be generated by the road surface analysis component 124 based upon the lidar points received by the road surface analysis component 124 from the perception system 122. The input features included in the input feature vector can include any of various features pertaining to the lidar points. By way of example, and not limitation, the input features can include x, y, and z coordinate values of a lidar point in the lidar points and an intensity of a lidar return associated with the lidar point. In further non-limiting examples, the input features can include maximum height of the lidar points, minimum height of the lidar points, variance of heights of the lidar points, maximum lidar return intensity of the lidar points, density of the lidar points on the road surface, or substantially any other feature indicative of presence or absence of road surface features.

The neural network component 308 outputs data indicative of a probability that a road surface feature is present on or in a road surface. With greater specificity, the output data is indicative of the probability that a road surface feature is present on or in the particular region of a road surface that is represented by the lidar points to which the input feature vector pertains. In an exemplary embodiment, the output layer of the neural network component 308 can be a softmax layer such that the outputs of the output layer can be interpreted directly as probabilities. In such embodiments, the neural network component 308 can be configured to output a plurality of probabilities, wherein each of the probabilities is representative of a probability that a particular type of road surface feature is present in or on the roadway. By way of an example, and not limitation, the neural network component 308 can be configured to output a first probability that a first type of road surface feature is present, a second probability that a second type of road surface feature is present, a third probability that a third type of road surface feature is present, and a probability that no road surface feature is present. Continuing the example, the first probability can be a probability that a pot hole is present in the road surface, the second probability can be a probability that a speed bump is present on the road surface, and the third probability can be a probability that debris is present on the road surface.

While operations of the road surface analysis component 124 have been described above in terms of a neural network component 308, it is to be understood that the road surface analysis component 124 can be configured to determine whether a road surface feature is present on a roadway by other means. By way of example, the road surface analysis component 124 can determine whether a road surface feature is present based upon comparing lidar data representative of a road surface to a plurality of lidar signatures of known road surface features.

For instance, signature data 132 can further be included in the data store 128, wherein the signature data 132 comprises a plurality of lidar signatures of known road surface features. In an exemplary embodiment, each of the signatures comprises a plurality of points from lidar point clouds, wherein the points have been previously determined to be representative of road surface features. The signature data 132 can include one or more signatures of each of various types of road surface features desirably identified by the road surface analysis component 124. In a non-limiting example, the signature data 132 can include one or more lidar signatures of manhole covers, one or more lidar signatures of potholes, one or more lidar signatures of speedbumps, one or more lidar signatures of motor vehicle accident debris, etc.

The road surface analysis component 124 can generate a similarity score between a signature in the signature data 132 and lidar data that is representative of a road surface in a travel path of the AV. The road surface analysis component 124 can determine that a road surface feature is present on a roadway in a travel path of the AV 100 based upon a value of the similarity score relative to a threshold value. For example, in some embodiments the road surface analysis component 124 determines that a road surface feature is present on the roadway based upon the similarity score exceeding a threshold value. In other embodiments, the road surface analysis component 124 determines that a road surface feature is present on the roadway based upon the similarity score falling below a threshold value. The road surface analysis component 124 can generate the similarity score by any of various algorithms. In a non-limiting example, the road surface analysis component 124 computes the similarity score as a sum of distances between pairs of points wherein for each pair one point is drawn from the lidar data and another drawn from a signature in the signature data. In this example, a lower similarity score is indicative of a greater similarity between the lidar data and the signature from the signature data 132. Accordingly, the similarity score can be considered to be indicative of a probability that a road surface feature is present on a roadway in the travel path of the AV 100.

In another exemplary embodiment, the road surface analysis component 124 can determine whether a road surface feature is present based upon comparing lidar data representative of a road surface to a height map included in the map data 130. The road surface analysis component 124 can generate a height map of the road surface for a region in a travel path of the AV 100 based upon lidar data received from the lidar sensor system 102. The road surface analysis component 124 can align the height map of the road surface generated from the lidar data with the height map included in the map data 130. The road surface analysis component 124 can compare the generated height map with the height map included in the map data 130 to determine whether the generated lidar height map conflicts with the pre-defined height map (included in the map data 130). The road surface analysis component 124 can determine that a conflict exists between the lidar height map and the pre-defined height map when the heights of a location on the road surface indicated by each of the height maps differ by greater than a threshold amount. In an exemplary embodiment, the road surface analysis component 124 determines that a road surface feature is present on the roadway responsive to determining that the generated height map and the pre-defined height map conflict at a number of locations that is greater than a threshold number. A number of conflicts between the generated height map and the pre-defined height map can be considered to be indicative of a probability that a road surface feature is present on a roadway in the travel path of the AV 100.

Referring now once again to FIG. 1, responsive to determining that a road surface feature is present in a roadway in a travel path of the AV 100, or determining a probability that a road surface feature is present in the roadway, the road surface analysis component 124 outputs, to the control system 126, an indication that the road surface feature is present or the probability that the road surface feature is present. The control system 126 controls operation of the mechanical systems of the AV 100 responsive to receiving the indication. In exemplary embodiments, responsive to receiving an indication that a road surface feature is present in the roadway, the control system 126 can control the AV to avoid the road surface feature. In other embodiments, responsive to receiving an indication that a road surface feature is present in the roadway, the control system 126 can control the AV to decelerate prior to traveling over the road surface feature.

In further exemplary embodiments, when the road surface analysis component 124 outputs an indication of a probability that a road surface feature is present in the roadway, the control system 126 can perform different actions depending on a magnitude of the probability. By way of example, and not limitation, the control system 126 can compare the probability to a first threshold and a second threshold. Responsive to the probability being below both the first threshold and the second threshold, the control system 126 can take no special action. Stated differently, when the probability is below both thresholds, the control system 126 controls the AV 100 normally. When the probability is above both thresholds, the control system 126 can control the AV 100 to avoid the road surface feature.

When the probability is below the second threshold but above the first threshold, the control system 126 can control the AV 100 to decelerate prior to reaching the road surface feature while not causing the AV 100 to avoid the road surface feature. Subsequently, as the AV 100 passes over the road surface feature, the IMU 104 outputs acceleration data that is indicative of an acceleration of the AV 100. The acceleration data indicates whether the AV 100 is accelerated vertically or laterally by travel over the road surface feature. For instance, when the AV 100 travels over a speed bump or a pot hole, the AV 100 is accelerated vertically as the vehicle travels over the feature. The acceleration may be perceptible by a passenger of the AV 100, which can reduce the perceived ride quality of the AV 100 to the passenger. When the acceleration data output by the IMU 104 indicates that the AV 100 is subject to an acceleration (e.g., not caused by the mechanical systems 110-114 of the AV 100) at the location of a potential road surface feature, the perception system 122 can update the map data 130 to indicate the presence of a road surface feature at the location. Therefore, the IMU 104 provides a confirmation of the presence of a road surface feature when the AV 100 travels over the road surface feature. The AV 100 can later be controlled to avoid the road surface feature based upon the road surface feature being indicated in the map data 130. By way of example, the AV 100 can be routed to avoid a route that passes over a roadway that has the road surface feature thereon. In another example, the AV 100 can be routed over the roadway that includes the road surface feature, but the AV 100 can be controlled to avoid the location of the road surface feature that is indicated on the map (e.g., by changing lanes).

In further embodiments wherein the neural network component 308 outputs a probability of each of a plurality of types of road surface features being present on a roadway, the control system 126 can be configured to control the AV 100 based upon the different probabilities. In a non-limiting example, the road surface analysis component 124 can output a first probability that a speed bump is present at a location on the roadway and a second probability that a pothole is present at the location on the roadway. Responsive to determining that the first probability is greater than the second probability, the control system 126 can control the AV 100 to decelerate prior to reaching the location without causing the AV 100 to avoid the location. Responsive to determining that the second probability is greater than the first probability, the control system 126 can control the AV 100 to avoid the location. Thus, the AV 100 can be configured to slow down for certain road surface features and can be configured to avoid other road surface features.

Figure 4:
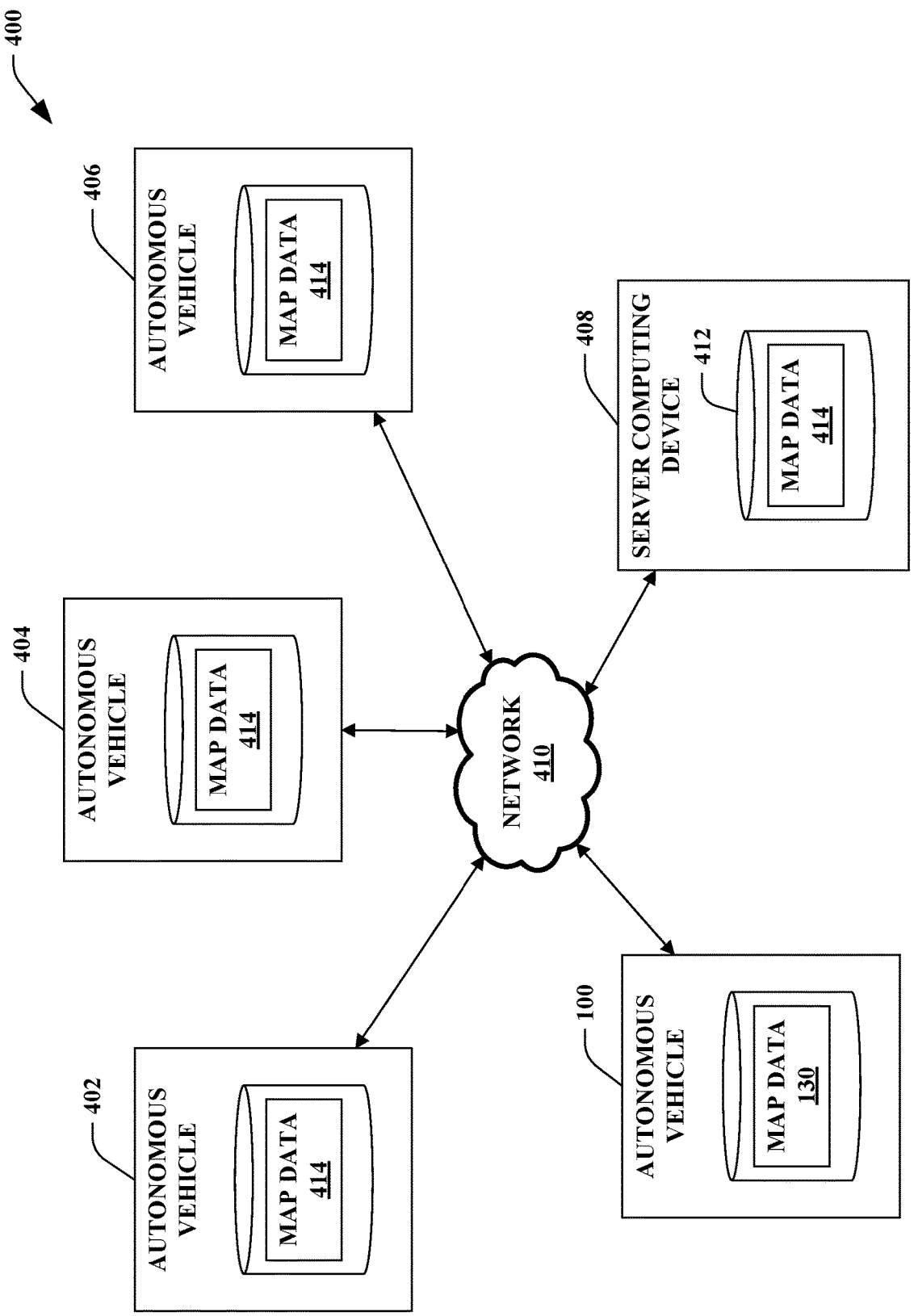
FIG. 4 is a functional block diagram of an exemplary system for control of a fleet of AVs based upon map data that includes road surface feature data.

The AV 100 can further be configured to communicate the presence of the road surface feature to a server computing device that controls various operations of a fleet of AVs, responsive to confirming that the road surface feature is present. With reference now to FIG. 4, an exemplary AV fleet system 400 is shown, wherein the fleet system 400 includes the AV 100, a plurality of additional AVs 402-406, and a server computing device 408 that is in communication with each of the AVs 100 and 402-406 by way of a network 410. The server computing device 408 includes a data store 412 that has map data 414 loaded thereon. The map data 414 can be master map data that is used by the server computing device 408 in connection with coordinating or controlling operation of the various AVs 100, 402-406 in the fleet system 400. Each of the AVs 402-406 can include a respective data store 416-420 on which is stored a copy of the master map data 414. In an exemplary embodiment, the perception system 122 of the AV 100 confirms the presence of a road surface feature at a particular location based upon acceleration data output by the IMU 104. Subsequently, the AV 100 can transmit map update data to the server computing device 408, wherein the map update data causes the server computing device 408 to update the map data 414 stored at the data store 412 with an indication that the road surface feature is present at the particular location. The server computing device 408 can then transmit the map update data to each of the AVs 402-406, whereupon the AVs 402-406 update their respectively stored map data 414 to include the indication that the road surface feature is present at the particular location. In various embodiments, the AV 100 can be configured to update its own map data 130 responsive to determining that the road surface feature is present at the particular location. In other embodiments, the system 400 can be configured such that the AV 100 updates its map data 130 to match the master map data 414 only in response to receiving map update data from the server computing device 408. This can facilitate consistency of map data maintained by the various AVs 100, 402-406 included in the fleet system 400.

In various embodiments, map data that includes an indication of a road surface feature can further include an indication of a time at which it was determined that the road surface feature was present. By way of example, and referring to FIG. 1, when the perception system 122 updates the map data 130 to include the indication that the road surface feature is present, the perception system 122 can include a time at which the acceleration data that was used to determine that the road surface feature is present was received from the IMU 104. Thereafter, the control system 126 can control the AV 100 to avoid or not avoid the road surface feature depending on an amount of time that has elapsed from the time at which the road surface feature was determined to be present. By way of example, and not limitation, the control system 126 can control the AV 100 to avoid a road surface feature that is indicated in the map data 130 as having been determined to be present an hour previously. In another non-limiting example, the control system 126 can control the AV 100 to pass over a road surface feature that is indicated in the map data 130 as having been determined to be present more than one week ago. Accordingly, the AV 100 can be configured to avoid recently identified road surface features (e.g., identified less than one month ago, less than two weeks ago, or less than one week ago), which are likely to still be present. The AV 100 can be configured not to avoid road surface features identified long ago (e.g., more than one week ago, more than two weeks ago, or more than one month ago).

The AV 100 can sometimes be routed over a previously-identified road surface feature (e.g., previously identified by the AV 100 or another AV that shares map data with the AV 100 such as the AVs 402-406 of FIG. 4). When the AV 100 is routed over a previously-identified road surface feature, the perception system 122 of the AV 100 confirms, based upon output of the IMU 104, whether the previously-identified road surface feature is still present. For example, the perception system 122 can update the map data 130 to indicate that the road surface feature is still present when the acceleration data output by the IMU 104 indicates that the AV 100 was subject to an acceleration due to the road surface feature. The perception system 122 can update the map data 130 to indicate that the road surface feature is not still present when the acceleration data output by the IMU 104 indicates that the AV 100 was not subject to an acceleration by the road surface feature. The AV 100 can therefore keep road surface feature data in the map data 130 up-to-date by allowing for the revisiting of road surfaces indicated in the map data 130 as including road surface features, when enough time has passed that the road surface features may no longer exist. When a fleet of AVs configured in a similar fashion to the AV 100 is operated in an operational region, the fleet of AVs can maintain current road surface feature data throughout the operational region without requiring special dispatches of AVs to perform mapping operations.

It is to be appreciated that some road surface features are likely to be present longer than others. For instance, motor vehicle accident debris is likely to be present on a roadway for less time than a pot hole, and a pot hole is likely to be present on a roadway for less time than a speed bump. A speed bump may itself be treated as being effectively permanent. Accordingly, the AV 100 can be configured such that the amount of elapsed time required before the AV 100 is permitted to be routed over a road surface feature is dependent on a type of the road surface feature.

By way of example, the perception component 122 can indicate a high probability that a first road surface feature is a pot hole and a high probability that a second road surface feature is motor vehicle accident debris (e.g., based upon output of the neural network component 308). In the example, the perception component 122 updates the map data 130 with indications that the first road surface feature and the second road surface feature are present. The indication that the first road surface feature is present can include an indication that the first road surface feature is likely to be a pot hole, and the indication that the second road surface feature is present can include an indication that the second road surface feature is likely to be motor vehicle accident debris. Motor vehicle accident debris is likely to be cleared from a roadway after less time than it takes for a pot hole to be repaired. The control system 126 can be configured to permit routing of the AV 100 over the first road surface feature after a first amount of time has passed, and can be configured to permit routing of the AV 100 over the second road surface feature after a second amount of time has passed, wherein the second amount of time is less than the first amount of time. The AV 100 can therefore be configured to avoid for a longer time road surface features that are likely to be present for a longer time.

As noted above, some road surface features may be treated as being effectively permanent. For instance, speed bumps and railroad crossings are generally present on roadways by design and are likely to be present for many years. In some instances, it may be undesirable to route the AV 100 around such road surface features where doing so causes a route taken by the AV 100 to be longer in distance or in time than if the AV 100 were routed over the road surface features. In other cases, the apparent effect on ride quality of may be sufficiently great and the alternative routing cost (e.g., in increased time, increased distance, or increased fare cost to a passenger) sufficiently low that Accordingly, when the road surface analysis system 124 indicates a high probability (e.g., greater than 50%, greater than 75%, or greater than 90%) that a road surface feature is of a type that is likely to be present for long periods of time (e.g., speed bumps, railroad crossings, rumble strips, etc.), the map data 130 can be updated to indicate that the road surface feature is a durable road surface feature. The AV 100 can be configured such that routing of the AV 100 around or over a durable road surface feature is not based upon an elapsed time since the road surface feature was identified. Accordingly, routing of the AV 100 around or over a durable road surface feature can be based primarily or solely on apparent effect on ride quality of the road surface feature (e.g., as indicated by a human-determined subjective measure or as indicated by a magnitude of the acceleration caused by the road surface feature as measured by the IMU 104) and the alternative routing cost associated with avoiding the road surface feature.

The AV 100 can further be configured such that, when the perception system 122 confirms that a road surface feature is present based upon acceleration data output by the IMU 104, the neural network component 308 is updated based upon the road surface feature. In an exemplary embodiment, the neural network component 308 can update a weight assigned to at least one of an edge or a node of the DNN of the neural network component 308 responsive to the perception system 122 confirming that the road surface is present based upon the acceleration data. With more specificity, the neural network component 308 can update weights of nodes and edges in the DNN based upon a reinforcement learning algorithm that takes into consideration values of the features of the input feature vector provided as input to the DNN, a probability that a road surface feature is present output by the DNN, and the actual presence or absence of the road surface feature as indicated by the acceleration data output by the IMU 104. The neural network component 308 can update weights of nodes and edges in the DNN in real-time during operation of the AV 100 in its driving environment. The road surface analysis component 124 therefore refines its model for determining whether road surface features are present as the AV 100 is operating, rather than requiring the AV 100 to be taken offline to retrain the neural network component 308.

Figure 5:
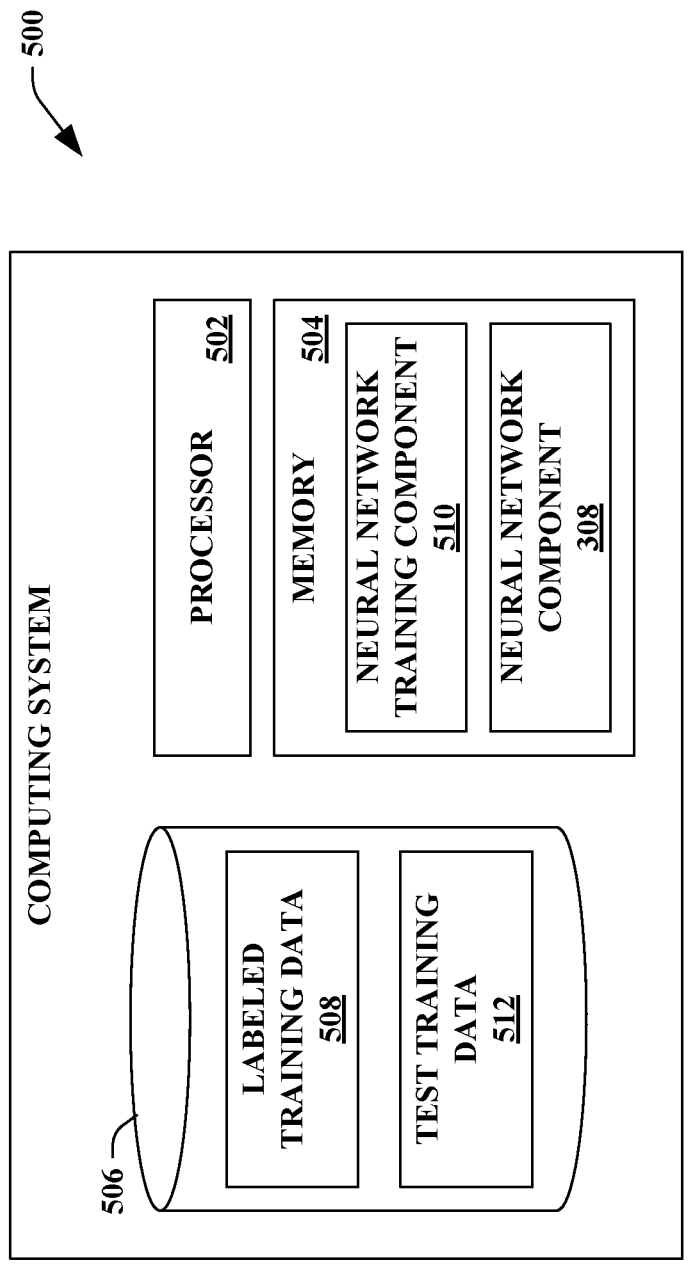
FIG. 5 is a functional block diagram of an exemplary system that is configured to train a neural network component included in the road surface analysis component depicted in FIG. 3.

With reference now to FIG. 5, an exemplary computing system 500 that is configured to train the neural network component 308 is illustrated. By way of example, the computing system 500 can be used to train the neural network component 308 prior to initial deployment of the AV 100. In another example, the computing system 500 can be used to retrain the neural network 308 during a period in which the AV 100 is taken out of operation for regularly scheduled maintenance. The computing system 500 includes a processor 502 and memory 504, wherein the memory 504 includes instructions that are executed by the processor 502. The computing system 500 additionally includes a data store 506 that comprises labeled training data 508. The labeled training data 508 can include, for example, input feature vectors that are representative of road surfaces that include road surface features and other input feature vectors that are representative of road surfaces that do not include road surface features. The input feature vectors are labeled as being either representative of road surface features or not representative of road surface features. The labeled training data 508 can be or include input feature vectors generated by a road surface analysis component of an AV and labeled by the road surface analysis component based upon output of an IMU, as described above with respect to the road surface analysis component 124 of the AV 100. For instance, responsive to acceleration data generated by the IMU 104 indicating that a road surface feature is present on a portion of a roadway, the road surface analysis component 124 can label an input feature vector that is representative of the portion of the roadway as being representative of a road surface feature. The road surface analysis component 124 can store the labeled input feature vector in the data store 128 for subsequent use in training a neural network to identify road surface features.

The memory 504 includes a neural network training component 510 that trains the neural network component 308. The neural network training component 510 receives the labeled training data 508. The neural network training component 510 trains the neural network component 308 such that the probability of a road surface feature being present that is output by the neural network component 308 is higher for input feature vectors that are representative of road surface features and lower for input feature vectors that are not representative of road surface features. The neural network training component 510 can train the neural network component 308 based upon supervised learning algorithms, reinforcement learning algorithms, or other suitable machine learning algorithms. The neural network component 308 can be validated based upon a test training data set 512, which is also labeled, to ensure that the neural network component 308 produces outputs with acceptable characteristics (e.g., such the neural network component 308 indicates a high probability that a road surface feature is present when the neural network is provided with an input feature vector that is actually representative of a road surface feature that is desirably detected).

Figure 6:
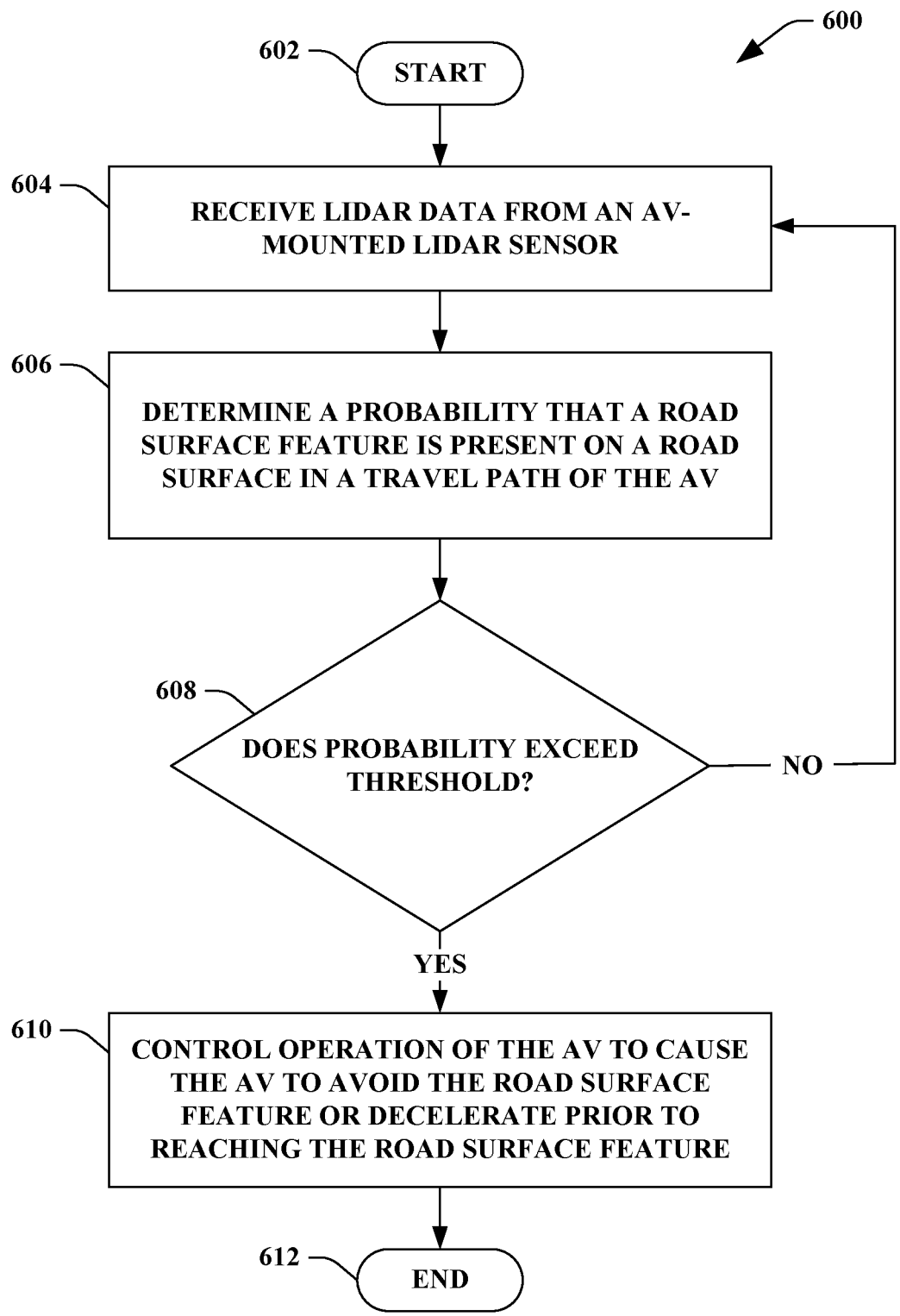
FIG. 6 is a flow diagram illustrating an exemplary methodology for controlling operation of a mechanical system of an AV based upon a determined probability that a road surface feature is present on a road surface.
Figure 7:
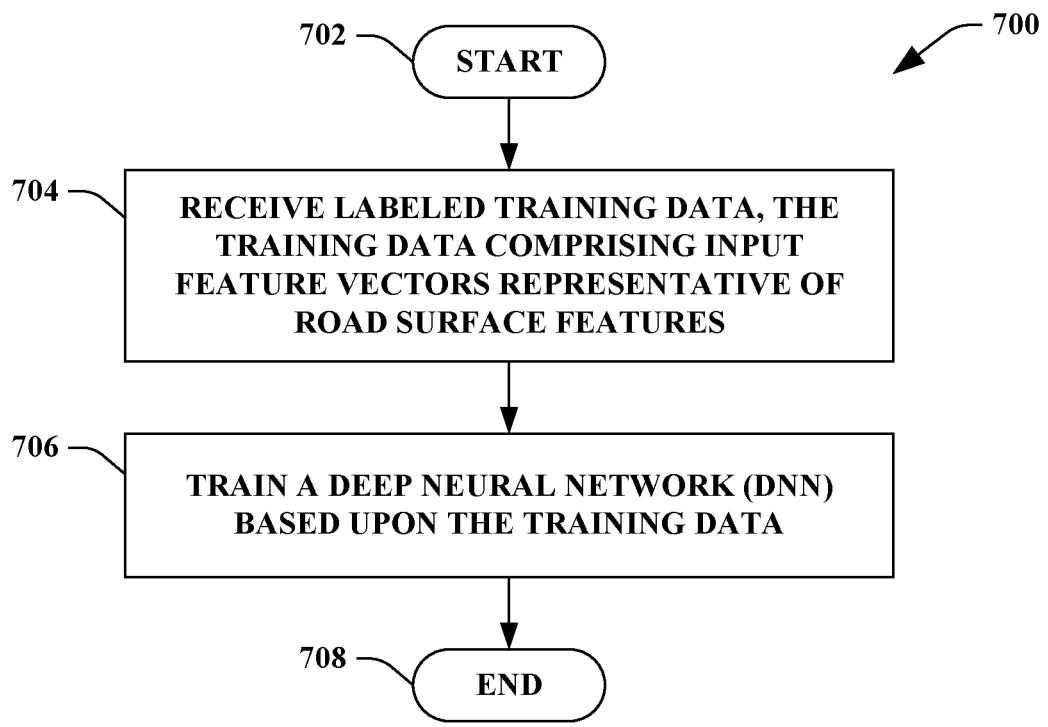
FIG. 7 is a flow diagram illustrating an exemplary methodology for training a neural network to be included in a road surface analysis component of an AV.

FIGS. 6 and 7 illustrate exemplary methodologies relating to controlling an AV based upon determining whether road surface feature is present on or in a roadway in a travel path of the AV. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for controlling operation of an AV based upon the presence of a road surface feature in or on a roadway in a travel path of the AV is illustrated. The methodology 600 starts at 602, and at 604 lidar data is received from a lidar sensor that is mounted on an AV. In exemplary embodiments, the lidar data comprises a lidar point cloud, wherein each of the points in the point cloud indicates a location of an object or surface in the driving environment. At least a portion of the points in the lidar point cloud are representative of a road surface in the travel path of the AV. At 606, a probability that a road surface feature is present on a road surface in a travel path of the AV is determined. In exemplary embodiments, the probability that the road surface feature is present can be determined based upon output of a DNN, as described in greater detail above with respect to the neural network component 308. In other embodiments, the probability that the road surface feature is present can be determined based upon a similarity score between the lidar data and a lidar signature of a known road surface feature. In still other embodiments, the probability that the road surface feature is present can be determined based upon a degree of conflict between a pre-defined height map of the road surface in the travel path of the AV, and a height map generated based upon the lidar data received at 604.

At 608 a determination is made whether the probability exceeds a threshold probability. If the probability does not exceed the threshold probability, then the methodology 600 returns to 604 and additional lidar data is received from the lidar sensor mounted on the AV. If the probability does exceed the threshold probability, the methodology 600 proceeds to 610 whereupon operation of the AV is controlled to cause the AV to avoid the road surface feature or decelerate prior to reaching the road surface feature. The AV can be controlled to avoid the road surface feature or to decelerate prior to reaching the road surface feature by controlling one or more of a propulsion system of the AV, a braking system of the AV, or a steering system of the AV. The methodology 600 then completes at 612. It is to be appreciated that the methodology 600 can be repeatedly performed by an AV as the AV travels through its driving environment.

Turning now to FIG. 7, an exemplary methodology 700 that facilitates training a DNN is illustrated, wherein the DNN is configured for use in a road surface analysis component of an AV to determine whether a road surface feature is present on or in a road surface that is in a travel path of the AV. The methodology 700 starts at 702, and at 704 labeled training data is received, wherein the training data comprises labeled input feature vectors that are derived from lidar data that is representative of road surfaces. At 706, a DNN is trained based upon the training data. The DNN is configured such that responsive to receiving a vector of input features that are derived from and representative of lidar data that is itself representative of a road surface, the DNN outputs a probability that a road surface feature is present on or in the road surface. The DNN is trained at 706 such that the DNN outputs a higher probability that a road surface is present on or in the road surface when the DNN is provided a vector of input features that is actually representative of a road surface having a road surface feature thereon/therein. Likewise, the DNN is trained at 706 such that the DNN outputs a lower probability that the road surface is present when the DNN is provided an input feature vector that is representative of a road surface that does not have a road surface feature thereon/therein. The methodology 700 completes at 708.

Figure 8:
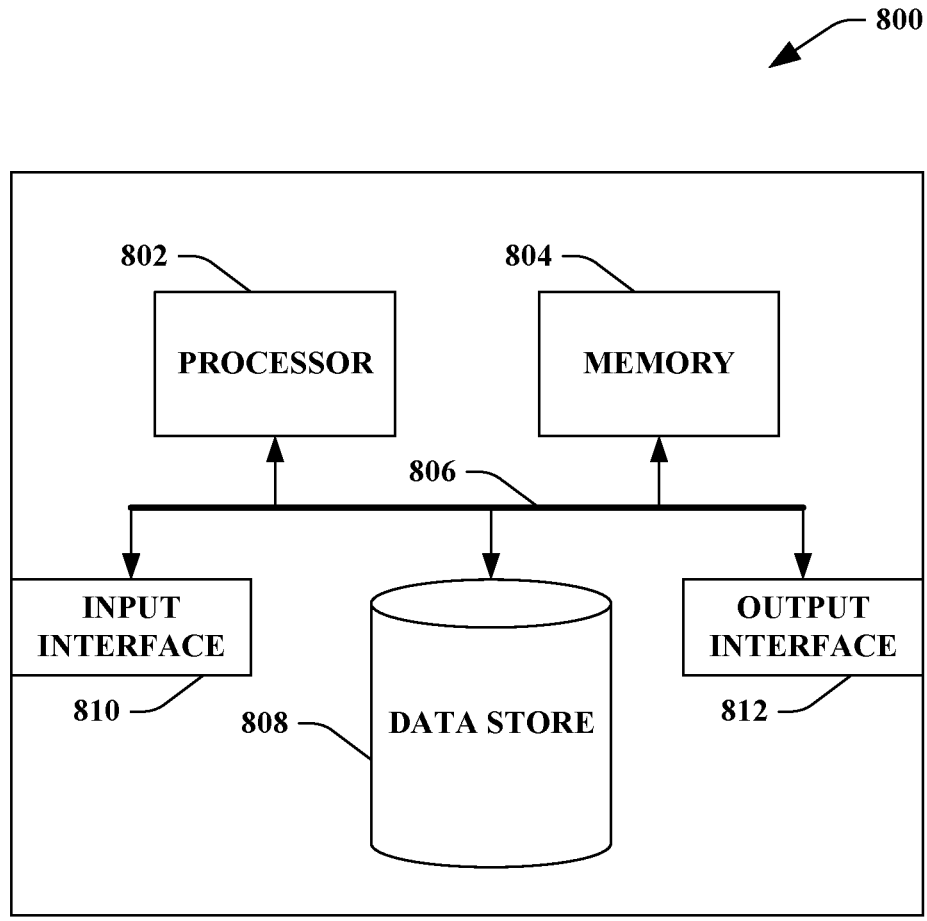
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be or include the computing system 116 or the computing system 500. The computing device 800 includes at least one processor 802 that executes instructions that are stored in a memory 804. The instructions may be, for instance, instructions for implementing functionality described as being carried out by one or more modules, components, or systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store point cloud data, map data, road surface feature data, training data, etc.

The computing device 800 additionally includes a data store 808 that is accessible by the processor 802 by way of the system bus 806. The data store 808 may include executable instructions, sensor data, map data, road surface feature data, training data, etc. The computing device 800 also includes an input interface 810 that allows external devices to communicate with the computing device 800. For instance, the input interface 810 may be used to receive instructions from an external computing device, etc. The computing device 800 also includes an output interface 812 that interfaces the computing device 800 with one or more external devices. For example, the computing device 800 may transmit control signals to the vehicle propulsion system 110, the braking system 112, and/or the steering system 114 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle (AV) comprising:
a lidar sensor system; and
a computing system that is in communication with the lidar sensor system, wherein the computing system comprises:
a processor; and
memory that stores instructions that, when executed by the processor, cause the processor to perform acts comprising:
receiving lidar data output by the lidar sensor system, the lidar data comprising a plurality of points, the points indicative of positions of objects in a driving environment of the AV;
identifying a portion of the lidar data as being representative of a road surface in a travel path of the AV;
generating a feature vector based upon the identified portion of the lidar data, the feature vector comprising one or more features that are representative of the identified portion of the lidar data;
providing the feature vector to a deep neural network (DNN), wherein responsive to receipt of the feature vector the DNN outputs a value;
determining, based upon the value output by the DNN, a probability that a road surface feature is present on or in the road surface that is in the travel path of the AV; and
responsive to determining that the probability exceeds a threshold, controlling at least one of a propulsion system, a braking system, or a steering system of the AV to cause the AV to avoid the road surface feature or to decelerate prior to traveling over the road surface feature.

2. The AV of claim 1, wherein the lidar data comprises a plurality of at least 1000 points per square meter at a location of the road surface feature.

3. The AV of claim 1, wherein responsive to determining that the probability exceeds the threshold, at least one of the propulsion system, the braking system, or the steering system of the AV is controlled to cause the AV to avoid the road surface feature.

4. The AV of claim 1, wherein responsive to determining that the probability exceeds the threshold, at least one of the propulsion system, the braking system, or the steering system of the AV is controlled to cause the AV to decelerate prior to traveling over the road surface feature.

5. The AV of claim 1, further comprising an inertial measurement unit (IMU), the acts further comprising:
receiving acceleration data from the IMU, the acceleration data indicative of an acceleration of the AV as the AV passes over a location of the road surface feature;
determining, based upon the acceleration data, whether the road surface feature is present at the location of the road surface feature; and
responsive to determining whether the road surface feature is present, updating a weight assigned to at least one of a node or an edge of the DNN.

6. The AV of claim 5, the weight of the at least one of the node or the edge of the DNN is updated based upon a reinforcement learning algorithm.

7. The AV of claim 1, wherein the DNN is trained based upon a supervised learning algorithm.

8. The AV of claim 1, further comprising an inertial measurement unit (IMU), the acts further comprising:
receiving acceleration data from the IMU, the acceleration data indicative of an acceleration of the AV as the AV passes over a location of the road surface feature;
determining, based upon the acceleration data, whether the road surface feature is present at the location of the road surface feature; and
responsive to determining that the road surface feature is present, updating map data stored on a data store included on the AV to indicate that the road surface feature is present at the location of the road surface feature.

9. The AV of claim 1, wherein responsive to determining that the probability is below a second threshold, controlling the AV to cause the AV to travel over the road surface feature.

10. The AV of claim 9, further comprising an inertial measurement unit (IMU), the acts further comprising:
receiving acceleration data from the IMU, the acceleration data indicative of an acceleration of the AV as the AV passes over a location of the road surface feature;
determining, based upon the acceleration data, whether the road surface feature is present at the location of the road surface feature; and
responsive to determining that the road surface feature is present, transmitting a map update to a server computing device that stores map data for use by a fleet of AVs in connection with navigation through an operational region that includes the location of the road surface feature, wherein the map update is configured to cause the server computing device to update the map data to include an indication that the road surface feature is present at the location of the road surface feature.

11. The AV of claim 1, wherein the acts further comprise comparing a point in the plurality of points to a road surface height indicated by a height map stored on a data store included on the AV, wherein the determining the probability that the road surface feature is present is based further upon the comparing.

12. The AV of claim 1, wherein the value output by the DNN is a first value, wherein responsive to receipt of the feature vector the DNN outputs a plurality of values comprising the first value, a second value, and a third value, the first value indicative of a probability that a first type of road surface feature is present on or in the road surface, the second value indicative of a probability that a second type of road surface feature is present on or in the road surface, the third value indicative of a probability that a third type of road surface feature is present on or in the road surface.

13. The AV of claim 12, wherein the first type of road surface feature is potholes, the second type of road surface feature is speed bumps, and the third type of road surface feature is debris present on the road surface.

14. A method for control of autonomous vehicles (AVs), the method comprising:
responsive to receiving lidar data output by a lidar sensor system included on an AV, the lidar data comprising a plurality of points, determining that a subset of the points are indicative of positions of a road surface in a travel path of the AV;
generating a feature vector based upon the subset of the points being determined to be indicative of positions of the road surface, the feature vector comprising one or more features that are representative of the subset of the points;
providing the feature vector to a deep neural network (DNN), wherein responsive to receipt of the feature vector the DNN outputs a value;

determining, based upon the value output by the DNN, a probability that a road surface feature is present on or in the road surface that is in the travel path of the AV; and responsive to determining that the probability exceeds a threshold, controlling at least one of a propulsion system, a braking system, or a steering system of the AV to cause the AV to perform a mitigation maneuver, the mitigation maneuver configured to cause the AV to avoid the road surface feature or to decelerate prior to traveling over the road surface feature.

15. The method of claim 14, wherein the road surface feature is at least one of a depression or a protuberance in the road surface.

16. The method of claim 14, further comprising:
receiving acceleration data from an inertial measurement unit (IMU) included on the AV, the acceleration data indicative of an acceleration of the AV as the AV passes over a location of the road surface feature;
determining, based upon the acceleration data, whether the road surface feature is present at the location of the road surface feature; and
updating map data stored on the AV to include an indication that the road surface feature is present at the location.

17. The method of claim 16, further comprising transmitting a map update to a server computing device, wherein the server computing device updates second map data stored at the server computing device to include an indication that the road surface feature is present at the location.

18. The method of claim 17, wherein transmitting the map update to the server computing device causes the server computing device to transmit a second map update to a second AV, wherein the second map update causes the second AV to update third map data stored on the second AV such that the third map data includes an indication that the road surface feature is present at the location, and wherein the second AV is controlled based upon the third map data.

19. A computer-readable storage medium that stores computer-executable instructions that, when executed by a processor, cause the processor to perform acts comprising:
receiving lidar data output by a lidar sensor system included on an autonomous vehicle (AV), the lidar data comprising a plurality of points, the points indicative of positions of objects in a driving environment of the AV;
labeling a portion of the lidar data as being representative of a road surface in a travel path of the AV;
generating a feature vector based upon the labeled portion of the lidar data, the feature vector comprising one or more values that are representative of points in the labeled portion of the lidar data;
providing the feature vector to a deep neural network (DNN), wherein responsive to receipt of the feature vector the DNN outputs a value;
determining, based upon the value output by the DNN, whether a road surface feature is present on or in the road surface that is in the travel path of the AV; and
responsive to determining that the road surface feature is present, controlling at least one of a propulsion system, a braking system, or a steering system of the AV to cause the AV to avoid the road surface feature or to decelerate prior to traveling over the road surface feature.

20. The computer-readable storage medium of claim 19, wherein determining whether the road surface feature is present is further based upon a height map of the road surface.

* * * * *